(12) United States Patent
Ahluwalia et al.

(10) Patent No.: US 7,743,136 B1
(45) Date of Patent: Jun. 22, 2010

(54) FREQUENCY-TABLE-BASED STORAGE FOR NETWORK PERFORMANCE DATA

(75) Inventors: Harpreet S. Ahluwalia, Old Bridge, NJ (US); Timothy J. Bardzil, San Jose, CA (US)

(73) Assignee: Avaya, Inc., Basking Ridge, NJ (US)

( * ) Notice: Subject to any disclaimer, the term of this patent is extended or adjusted under 35 U.S.C. 154(b) by 1550 days.

(21) Appl. No.: 11/042,580

(22) Filed: Jan. 25, 2005

(51) Int. Cl.
*G06F 15/173* (2006.01)
(52) U.S. Cl. .................................................... 709/224
(58) Field of Classification Search ................... 709/224
See application file for complete search history.

(56) References Cited

U.S. PATENT DOCUMENTS

2003/0088542 A1\* 5/2003 McGee et al. ................... 707/1
2003/0091165 A1\* 5/2003 Bearden et al. .......... 379/88.08

\* cited by examiner

*Primary Examiner*—Larry Donaghue
(74) *Attorney, Agent, or Firm*—Douglas Grover (57) ABSTRACT

A network services system (100) uses frequency tables (300) to store real-time network performance data such as delay, jitter, loss, loss burstiness, and mean opinion score (MOS) for a real-time communications protocol such as the Real Time Protocol (RTP).

21 Claims, 11 Drawing Sheets

FIG. 1

FIG. 2
FREQUENCY-TABLE CLASS DEFINITIONS

| CLASS ID | METRIC | LOWER LIMIT | UPPER LIMIT |
|---|---|---|---|
| 1 | DELAY | 0 | 2 |
| 2 | DELAY | 2 | 4 |
| 3 | DELAY | 4 | 6 |
| 4 | DELAY | 6 | 8 |
| 5 | DELAY | 8 | 10 |
| 6 | DELAY | 10 | 15 |
| 7 | DELAY | 15 | 20 |
| 8 | DELAY | 20 | 25 |
| 9 | DELAY | 25 | 30 |
| 10 | DELAY | 30 | 35 |
| 11 | DELAY | 35 | 50 |
| 12 | DELAY | 50 | 65 |
| ⋮ | ⋮ | ⋮ | ⋮ |
| 100 | DELAY | 950 | 1000 |
| 101 | JITTER | 0 | 1 |
| 102 | JITTER | 1 | 2 |
| 103 | JITTER | 2 | 3 |
| 104 | JITTER | 3 | 4 |
| 105 | JITTER | 4 | 5 |
| 106 | JITTER | 5 | 7 |
| 107 | JITTER | 7 | 9 |
| 108 | JITTER | 9 | 11 |
| 109 | JITTER | 11 | 13 |
| 110 | JITTER | 13 | 15 |
| 111 | JITTER | 15 | 20 |
| 112 | JITTER | 20 | 25 |
| ⋮ | ⋮ | ⋮ | ⋮ |
| 200 | JITTER | 280 | 300 |
| 201 | MOS | 1 | 1.2 |
| 202 | MOS | 1.2 | 1.4 |
| 203 | MOS | 1.4 | 1.6 |
| 204 | MOS | 1.6 | 1.8 |
| 205 | MOS | 1.8 | 2 |
| ⋮ | ⋮ | ⋮ | ⋮ |
| 250 | MOS | 4.8 | 5 |

⋮

FIG. 3
FREQUENCY TABLES

| | CLASS ID | BEGIN | END | COUNT | | |
|---|---|---|---|---|---|---|
| | 1 | 1-JAN-04 | 2-JAN-04 | 6 | ⎫ DAY 1 | |
| | 2 | 1-JAN-04 | 2-JAN-04 | 47 | | FREQUENCY TABLE |
| (OMIT) | 3 | 1-JAN-04 | 2-JAN-04 | 0 | ⎬ 300 | FOR DELAY FOR |
| | 4 | 1-JAN-04 | 2-JAN-04 | 18 | | DAY 1 |
| | ⋮ | ⋮ | ⋮ | ⋮ | ⎭ | |
| | 100 | 1-JAN-04 | 2-JAN-04 | 87 | ⎫ | |
| | 101 | 1-JAN-04 | 2-JAN-04 | 1 | | |
| | 102 | 1-JAN-04 | 2-JAN-04 | 44 | | FREQUENCY TABLE |
| | 103 | 1-JAN-04 | 2-JAN-04 | 3 | ⎬ 300 | FOR JITTER FOR |
| | 104 | 1-JAN-04 | 2-JAN-04 | 7 | | DAY 1 |
| (OMIT) | 105 | 1-JAN-04 | 2-JAN-04 | 0 | | |
| | ⋮ | ⋮ | ⋮ | ⋮ | ⎭ | |
| | 200 | 1-JAN-04 | 2-JAN-04 | 101 | ⎫ | |
| (OMIT) | 201 | 1-JAN-04 | 2-JAN-04 | 0 | | FREQUENCY TABLE |
| | 202 | 1-JAN-04 | 2-JAN-04 | 6 | ⎬ 300 | FOR MOS FOR |
| | 203 | 1-JAN-04 | 2-JAN-04 | 19 | | DAY 1 |
| | ⋮ | ⋮ | ⋮ | ⋮ | | |
| (OMIT) | 250 | 1-JAN-04 | 2-JAN-04 | 0 | ⎭ | |
| | ⋮ | ⋮ | ⋮ | ⋮ | | |
| | 1 | 2-JAN-04 | 3-JAN-04 | 1 | ⎫ DAY 2 | |
| | 2 | 2-JAN-04 | 3-JAN-04 | 4 | | FREQUENCY TABLE |
| | 3 | 2-JAN-04 | 3-JAN-04 | 4 | ⎬ 300 | FOR DELAY FOR |
| | 4 | 2-JAN-04 | 3-JAN-04 | 77 | | DAY 2 |
| | ⋮ | ⋮ | ⋮ | ⋮ | ⎭ | |
| | 100 | 2-JAN-04 | 3-JAN-04 | 11 | ⎫ | |
| | 101 | 2-JAN-04 | 3-JAN-04 | 1 | | |
| | 102 | 2-JAN-04 | 3-JAN-04 | 44 | | FREQUENCY TABLE |
| (OMIT) | 103 | 2-JAN-04 | 3-JAN-04 | 0 | ⎬ 300 | FOR JITTER FOR |
| | 104 | 2-JAN-04 | 3-JAN-04 | 7 | | DAY 2 |
| | 105 | 2-JAN-04 | 3-JAN-04 | 54 | | |
| | ⋮ | ⋮ | ⋮ | ⋮ | ⎭ | |
| | 200 | 2-JAN-04 | 3-JAN-04 | 5 | ⎫ | |
| | 201 | 2-JAN-04 | 3-JAN-04 | 3 | | FREQUENCY TABLE |
| | 202 | 2-JAN-04 | 3-JAN-04 | 4 | ⎬ 300 | FOR MOS FOR |
| | 203 | 2-JAN-04 | 3-JAN-04 | 98 | | DAY 2 |
| | ⋮ | ⋮ | ⋮ | ⋮ | ⎭ | |

FIG. 8 ing the data in frequency tables each indicating how much of
FREQUENCY-TABLE-BASED STORAGE FOR NETWORK PERFORMANCE DATA

TECHNICAL FIELD

This invention generally relates to the fields of network-performance determination and data-storage formats.

BACKGROUND OF THE INVENTION

When monitoring the performance of real-time transmission protocols such as the Real Time Protocol (RTP) in a voice over Internet protocol (VoIP) environment, there are several performance-related metrics that need to be recorded. These include delay, jitter, packet loss, loss burst, and Mean Opinion Score (MOS). In a system designed to monitor the quality—either real or simulated—of VoIP calls, there is a need to store values of these performance metrics over time so that they may be analyzed and historical observations can be made. Given the potential high volume of calls, an efficient storage structure must be used in order to minimize the amount of data that must be stored while still providing enough detail in the data to make intelligent observations.

The commercial practice for storing similar data has been to store the minimum, maximum, and/or averages of the observed data over time. Examples thereof are the VoIP Monitoring Manager (VMM) application from Avaya Inc., and the MultiRouter Traffic Grapher (MRTG), a popular monitoring freeware tool, both of which store data as averages. Because this approach tends to "smooth" the data over time, it results in the loss of the details of the distribution of the data when the data is aggregated. Another known technique is "box-and-whisker" distribution. A typical box-and-whisker distribution consists of recording only the values for the $1^{st}$, $25^{th}$, $50^{th}$, $75^{th}$, and $99^{th}$ percentiles within the distribution. While this technique yields storage in constant size and retains some higher-level resolution of the distribution, it is inadequate because percentile data cannot be aggregated over longer time periods. For example, hourly data cannot be aggregated to yield daily results.

Therefore, there is a need to solve the problem of storing real-time network performance data for an arbitrary number of calls between pairs of entities, such as endpoints or subnets, for example, in a limited amount of space while retaining the details of the distribution of the data. Furthermore, this must be done in a manner that allows for the data to be aggregated over time without losing the details of the distribution or introducing substantial error or smoothing effects in the values of the data.

SUMMARY OF THE INVENTION

According to the invention, network performance data is stored in frequency tables. A frequency table is a statistical model for storing the number of observations that fall within each of a plurality of ranges (class intervals). Illustratively, the data for each performance metric is stored in frequency tables using class intervals of varying widths. The lower limit of the first class and the upper limit of the last class define the overall range of measurements that can be recorded in the table.

Illustratively, a method according to the invention of monitoring network performance comprises gathering over time data on performance of a communications network and storing the data in frequency tables each indicating how much of the data within a time interval falls within a data range. The invention also illustratively encompasses any computer-readable medium containing instruction which, when executed in a computer, cause the computer to perform the method steps. The invention also illustratively comprises apparatus that performs the method. This apparatus preferably includes an effector—any entity that affects the corresponding step, unlike a means—for each step. An illustrative embodiment of the invention comprises a network monitor that gathers over time data on performance of a communications network, and a data storage facility that stores the data gathered by the network monitor in frequency tables each indicating how much of the data within a time interval falls within a data range.

Storing network performance data in frequency tables allows the system to produce more meaningful results to users while requiring a smaller amount of raw storage space. Thus, for example, years of RTP monitoring data on the quality or health of VoIP on a network can be stored for individual endpoint pairs, subnets, or other entities, without losing the details of the distribution of the data and without any substantial error or smoothing in the stored values.

BRIEF DESCRIPTION OF THE DRAWING

These and other features and advantages of the invention will become more apparent from the following description of an illustrative embodiment of the invention considered together with the drawing, in which.

DETAILED DESCRIPTION

Figure 1:
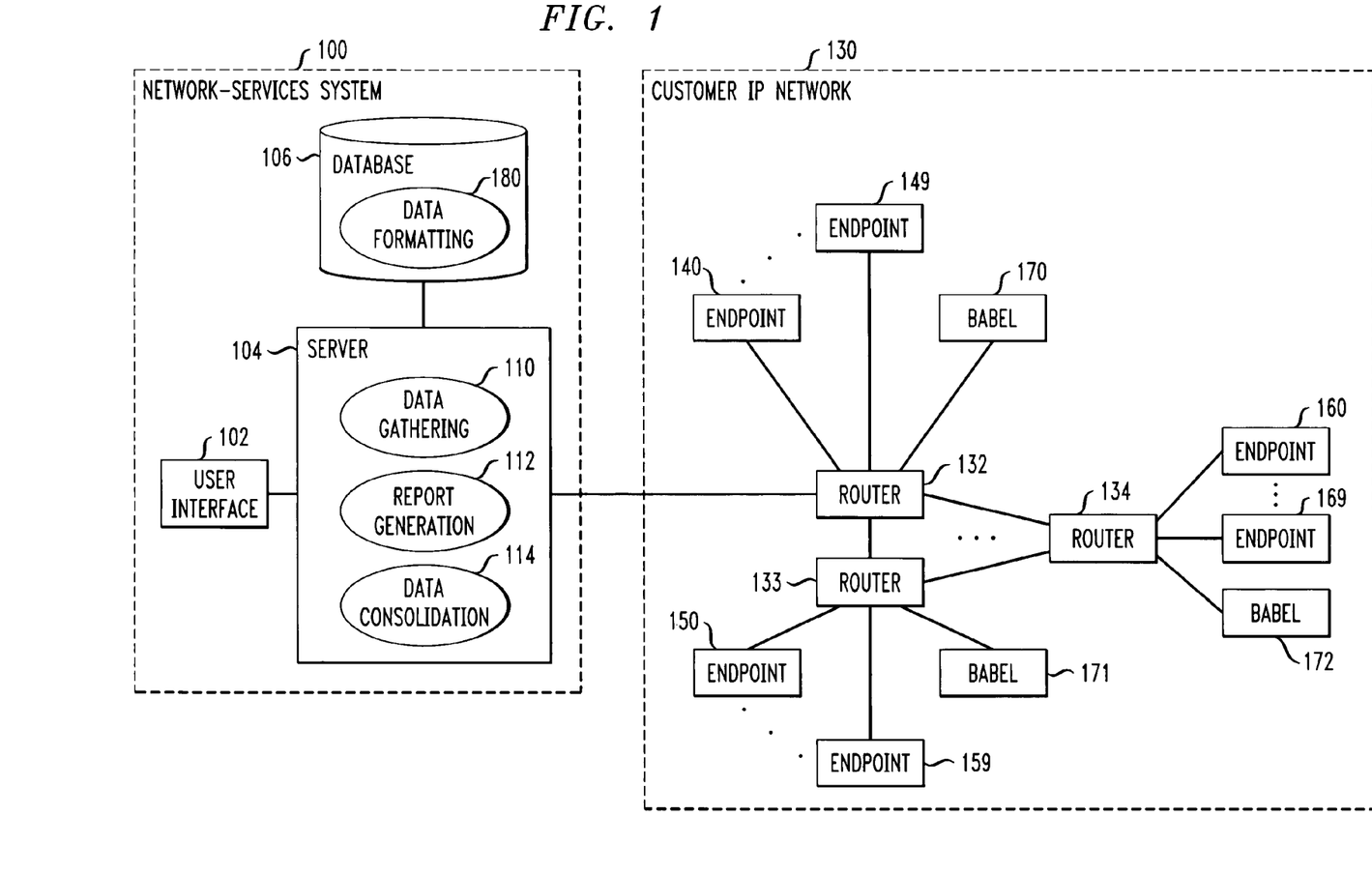
FIG. 1 is a block diagram of an IP network that includes an illustrative embodiment of the present invention.

FIG. 1 shows an illustrative IP network that includes an exemplary implementation of the invention. The network of FIG. 1 includes a customer IP network 130, and a network services system 100 for monitoring network 130. Network 130 comprises a plurality of interconnected routers 132-134. Each router 132, 133, 134 serves a set of endpoints 140-149, 150-159, 160-169, respectively, that are connected to the router. Illustratively, endpoints 140-169 communicate with each other through network 130 using the Real Time Protocol (RTP). Also connected to routers 132-134 are babels 170-172. A babel is a device that emulates an endpoint by generating traffic and transmitting the generated traffic through network 130 for purposes of testing performance of network 130. Zero or more babels 170-172 are connected to each one of routers 132-134; in the illustrative configuration of FIG. 1, one babel 170-172 is connected to each router 132-134, respectively. Alternatively, babels 170-172 can be integrated into selected ones of endpoints 140-169.

Network services system 100 includes a network monitor such as a server 104 that is connected to one or more routers 132-134 for the purpose of controlling operation of babels 170-172 and gathering performance data on network 130. Server 104 also functions as a report-generating facility, analyzing the performance data to generate reports on network 130 operation. For these purposes, server 104 includes a data generation function 110 and a report generation function 112. A user interface 102, illustratively a workstation, is connected to server 104. Service personnel interact with server 104 via user interface 102. Also connected to server 104 is a data storage facility such as a database 106 in which server 104 stores the performance data that it gathers on network 103. Database 106 may be a stand-alone stored-program controlled device; alternatively, database 106 is integrated into server 104 which is a stored-program controlled device. As described so far, the network of FIG. 1 is conventional.

According to the invention, database 106 includes a data-formatting function 180 which stores performance data that are entered into database 106 in frequency-table format. The data for each performance metric is stored in frequency tables using class intervals (ranges) of varying widths. A frequency table is a statistical model for storing the number of observations that fall within each of the class intervals. The lower limit of the first class and the upper limit of the last class define the overall range of measurements that can be recorded in the table.

Storing the data in frequency tables allows the system to produce more meaningful results to users while requiring a smaller amount of raw storage space. Thus, for example, years of RTP monitoring data on the quality or health of VoIP on a network can be stored for individual endpoint pairs without losing the details of the distribution of the data and without any substantial error or smoothing in the stored values.

Figure 2:
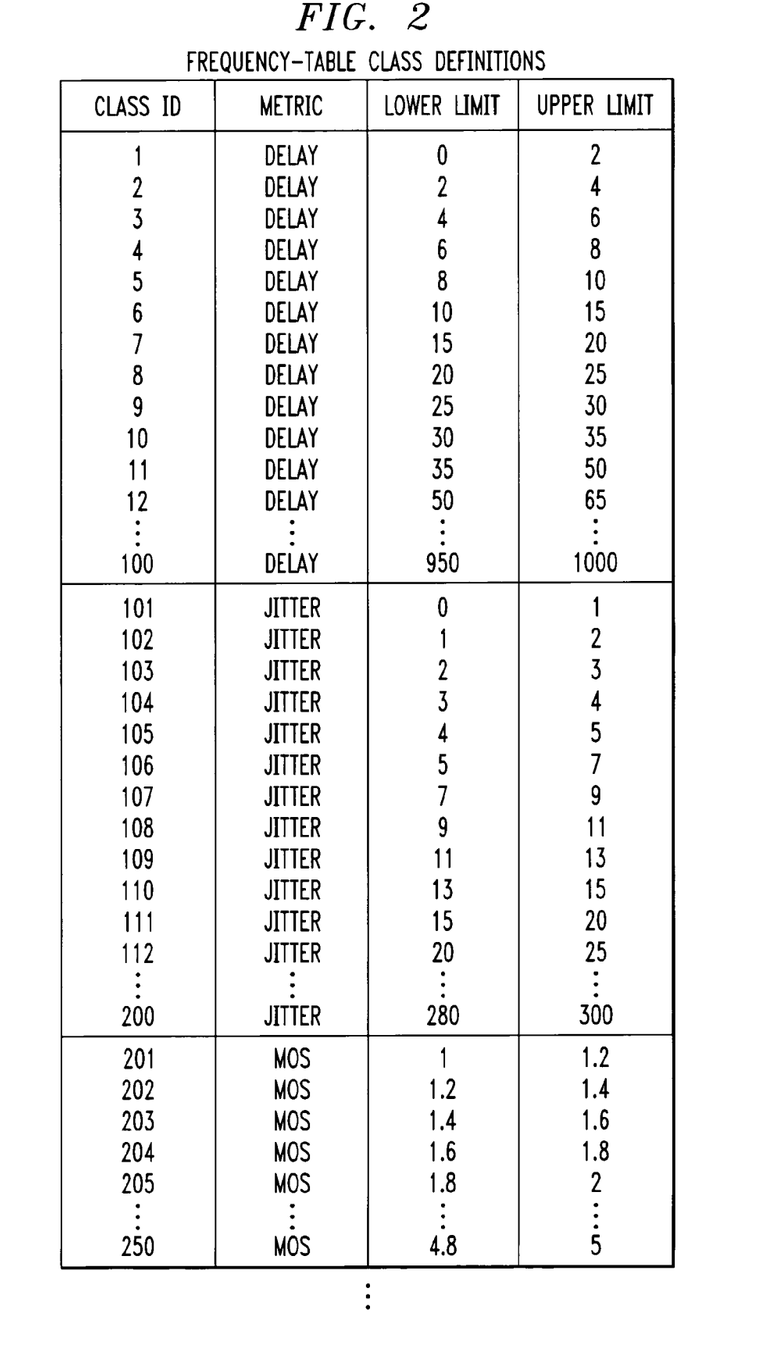
FIG. 2 shows illustrative frequency-table class definitions of a database function of the network services system of the IP network of FIG. 1.

Function 180 includes a table 200 of a plurality frequency-table class definitions 202, an illustrative example of which is shown in FIG. 2. Each class definition 202 defines a class, or type, of a frequency table. Each class definition 202 comprises a class identifier (ID), an identifier of the performance metric that it represents, and a definition of the lower limit and the upper limit of the class interval.

Class-interval definitions typically are different for each RTP performance metric. Care must be taken when selecting appropriate class intervals because their definitions cannot be easily changed once the system has started gathering data. In general, the process of defining class intervals has two parts:
Defining a fixed overall value range for each measurement. This may be a trivial task if a fixed range exists for the measurements, as in the case for Mean Opinion Score, for example. Otherwise, some fixed upper and lower bounds may be defined for expected values or values of interest. For example, one typically does not need to record a one-way packet-delay value great than 500 ms because the packet will be treated as a lost packet after this point. Therefore, one could define a fixed range for delay values ranging from 0-500 ms.
Defining the size of each class interval within the value range. This introduces a potential error of up to one-half the class interval size for each metric. For example, one might choose a fixed 5 ms class interval for delay measurements, which would introduce an error of 2.5 ms in the values of delay, which for most practical purposes is not significant. In general, one should select the largest possible class interval where this error remains "insignificant," noting that this determination will vary from measurement to measurement.

Each of the five key RTP metrics should preferably be treated in a slightly different way, as follows:
Delay—One-way and/or round-trip. In theory, delay does not have an absolute upper bound, yet at some point delay becomes irrelevant. This occurs when excessive delay lowers the quality to such a low level that any additional delay would not have any perceived impact. Therefore, this value can be chosen as an upper limit, and class intervals are defined between zero and this value.
Jitter—Like delay, jitter does not have an absolute upper bound, and the same principles apply. At some point, the jitter buffer in the endpoint will start to discard packets, and therefore values greater than this need not be recorded. The value where this occurs is highly dependent on the jitter buffer that is being used. Again, class intervals are defined between zero and this upper limit.
Loss—Each packet in an RTP session is either lost or not lost, so this information cannot be stored directly in a frequency table. However, calculations of a loss rate (in percentage) over some number of packets or a time interval allows these values to be recorded in a frequency table ranging from 0-100.
Loss Burstiness—This metric records the "burstiness" of any packet loss that occurs. Successive lost packets impact voice quality far worse than randomly-spaced lost packets. If a lost burst is defined as the maximum-length run of lost packets over some number of packets or some time interval, then this value can be recorded in a frequency table where classes are defined between zero and the maximum size of this interval.
MOS—Mean Opinion Score ranges from 1-5, and hence these values are suitable for direct storage in a frequency table.

Frequency-table-based storage inherently introduces some error into the data being recorded. Fortunately, from a voice-quality perspective, small amounts of error can be tolerated. For example, one does not really care about knowing if the delay was 40 ms vs. 42 ms, because, for all practical purposes, these values are equivalent in terms of their impact on voice quality. If there is a real need for higher-precision storage, the granularity of class intervals may be decreased. But reducing the size of the class intervals in order to reduce the introduced error has the effect of increasing the size of the frequency table. This concern is addressed as follows:
The amount of introduced error can be minimized through the use of variable-sized class intervals. The idea is that the class size is smaller in the range that is considered to be most important and larger in the range that is considered to be of least importance. This yields a lower error and hence a higher degree of resolution within the key regions, while significantly reducing the overall size of the table. For example, for delay, the class width can be 1 ms from 0-1 ms, 2 ms from 1-10 ms, 4 ms from 10-100 ms, 5 ms from 100-500 ms, and so on. The specific class-interval definitions typically differ for each RTP performance metric.
The size of the stored frequency tables can be further reduced by an additional optimization: if no measurements have been recorded within a particular class interval, then one can simply omit this interval from the stored table rather than include the interval with a count size of zero. For the intervals that are missing, a count of zero will be assumed.

Figure 3:
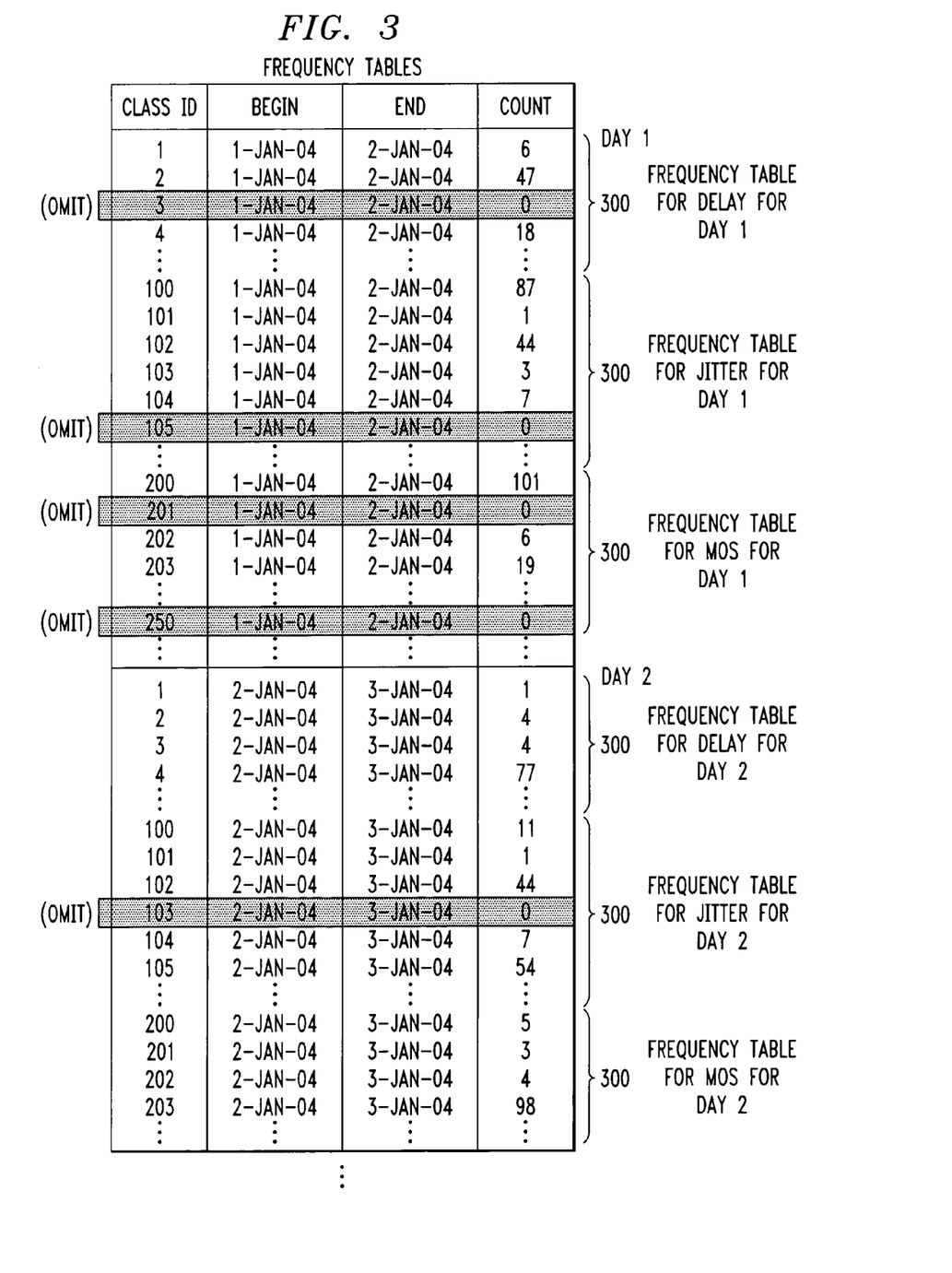
FIG. 3 shows illustrative frequency tables of the database of the network services system of the IP network of FIG. 1.

Function 180 uses class definitions 202 to create frequency tables 300 in database 106. An illustrative example of frequency tables 300 is shown in FIG. 3. There is a frequency table 300 for each metric for each measurement time-period (e.g., a day). Thus, over an extended period of time, there is a set of frequency tables for each metric. In a running system, recorded metrics can be stored in their corresponding frequency tables for a given number of packets, on a per-call basis, or over any arbitrary period of time (e.g., 30 secs.). For each metric, one can keep creating instances of such frequency tables with time. Thus, for each pair of endpoints, subnets, groups, or at any other logical level (generically referred to as "entities") involved in RTP sessions, there will be a frequency table for each metric for data collected in a particular time-span. After that time-span is over, a new frequency table will be created for that metric between the pair of entities (See FIG. 3). Furthermore, for long-duration, historical monitoring, the frequency tables can be aggregated over longer and longer periods of time without introducing any 'smoothing' effects.

Figure 4:
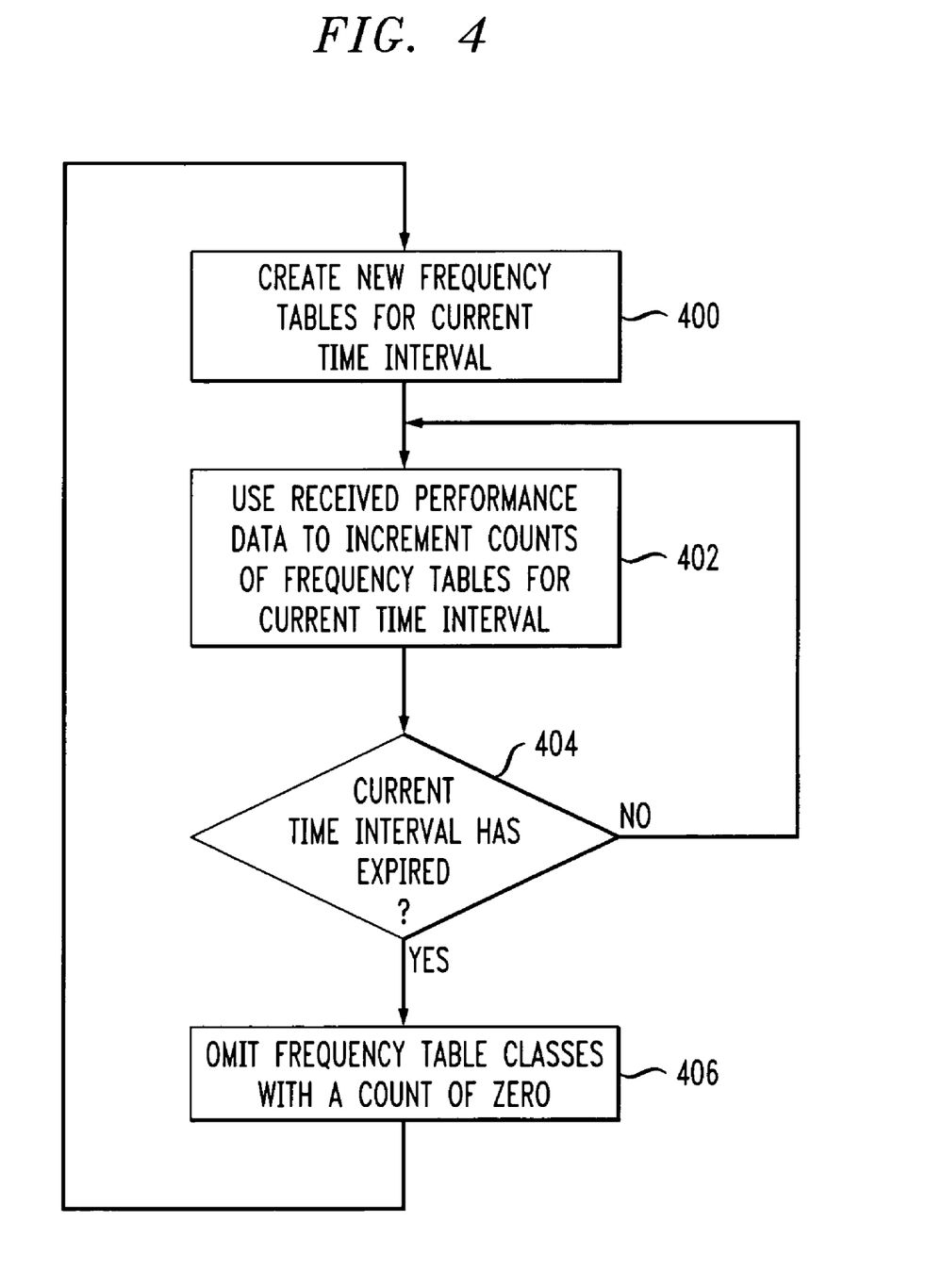
FIG. 4 is a functional flow diagram of operation of the above-mentioned database function.

The basic operation of function 180 is illustrated in FIG. 4. During normal operation of system 100, when it is monitoring performance of network 130, function 180 creates new frequency tables for a current time interval, at step 400. It then uses data on performance of network 130 during the current time interval that it receives from server 104 to increment the counts of the frequency tables for the current time interval, at step 402. Function 180 continues to perform step 402 until the current time interval expires, as indicated at step 404. Function 180 then optionally omits from database 106 those frequency table classes for the current time interval whose count is zero, at step 406, and proceeds to steps 400 et seq. to create and populate frequency tables for the next current time interval.

The biggest advantage of storing network performance data in the described fashion is that the details of the distribution of data are always there and remain there even if the data is consolidated (aggregated) over time. This functionality is effected by a data consolidation function 114 of server 104 of FIG. 1. To clarify, assume that data for a particular metric for all calls between two specific endpoints from time t0 to time t1 is stored in frequency table A. Similarly, data for the same metric for all calls between the same two endpoints from time t1 to time t2 is stored in a frequency table B, and the data from time t2 to time t3 is stored in a frequency table C. Then an aggregate frequency table from time t0 to t3 can be obtained simply by adding up the counts of the corresponding classes in frequency tables A, B, and C, and then tables A, B, and C may be deleted to free up the storage space that they occupy. The details (the classes and the corresponding counts) of the distribution are preserved by the aggregate table and one can clearly see how the data was distributed in the various classes. Thus, storing RTP metric data from calls in this manner does not result in any loss of details about the distribution of the data; one is able to aggregate the data over any time period—hours, days, weeks, etc.—and still see the complete distribution of the data. This allows for increasing consolidation (over longer intervals) of historical data as it ages, to conserve storage space yet without losing details.

Figure 5:
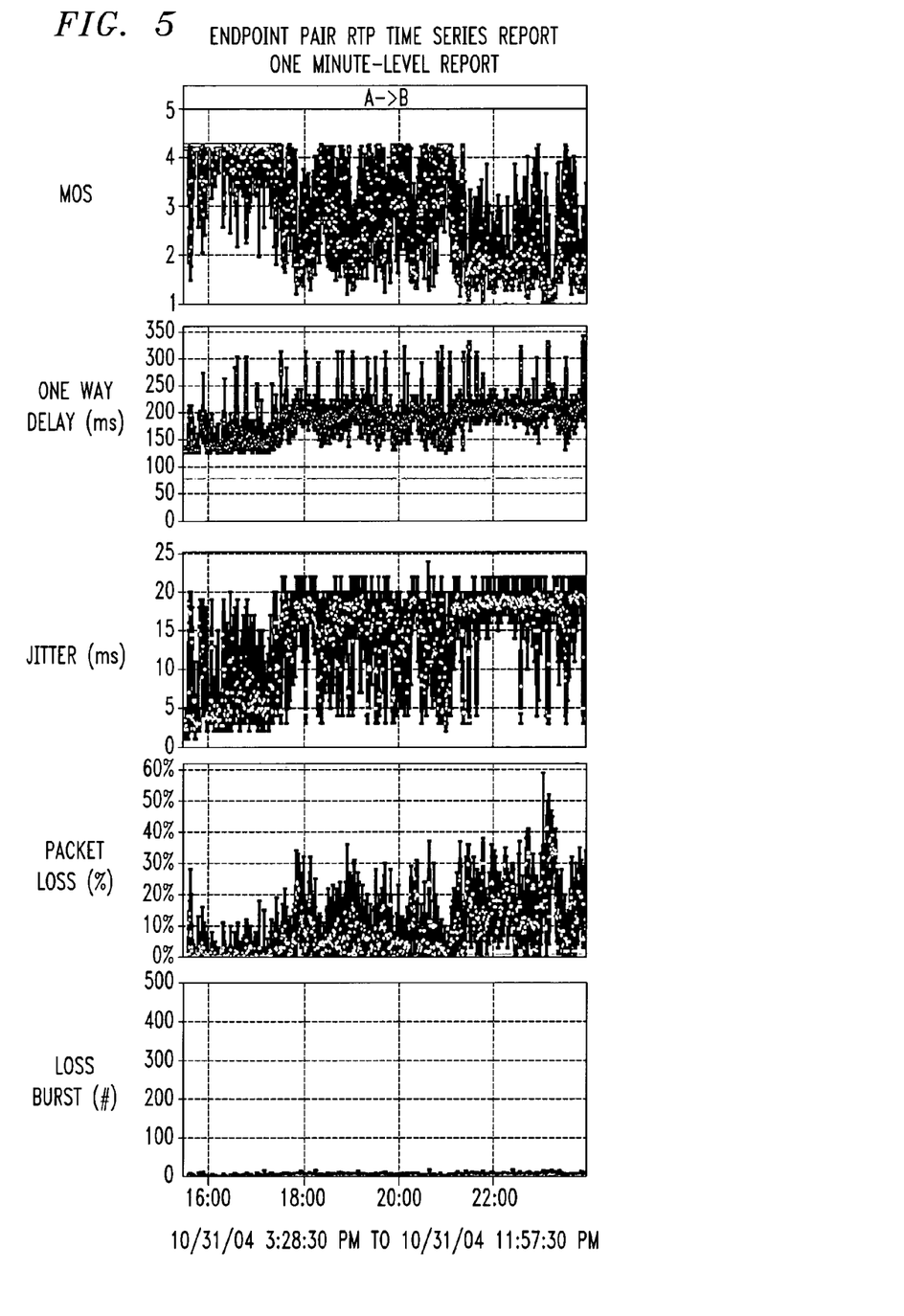
FIGS. 5-8 show reports over different time periods generated by a report-generation function of a server of a network-services system of the IP network of FIG. 1.
Figure 6:
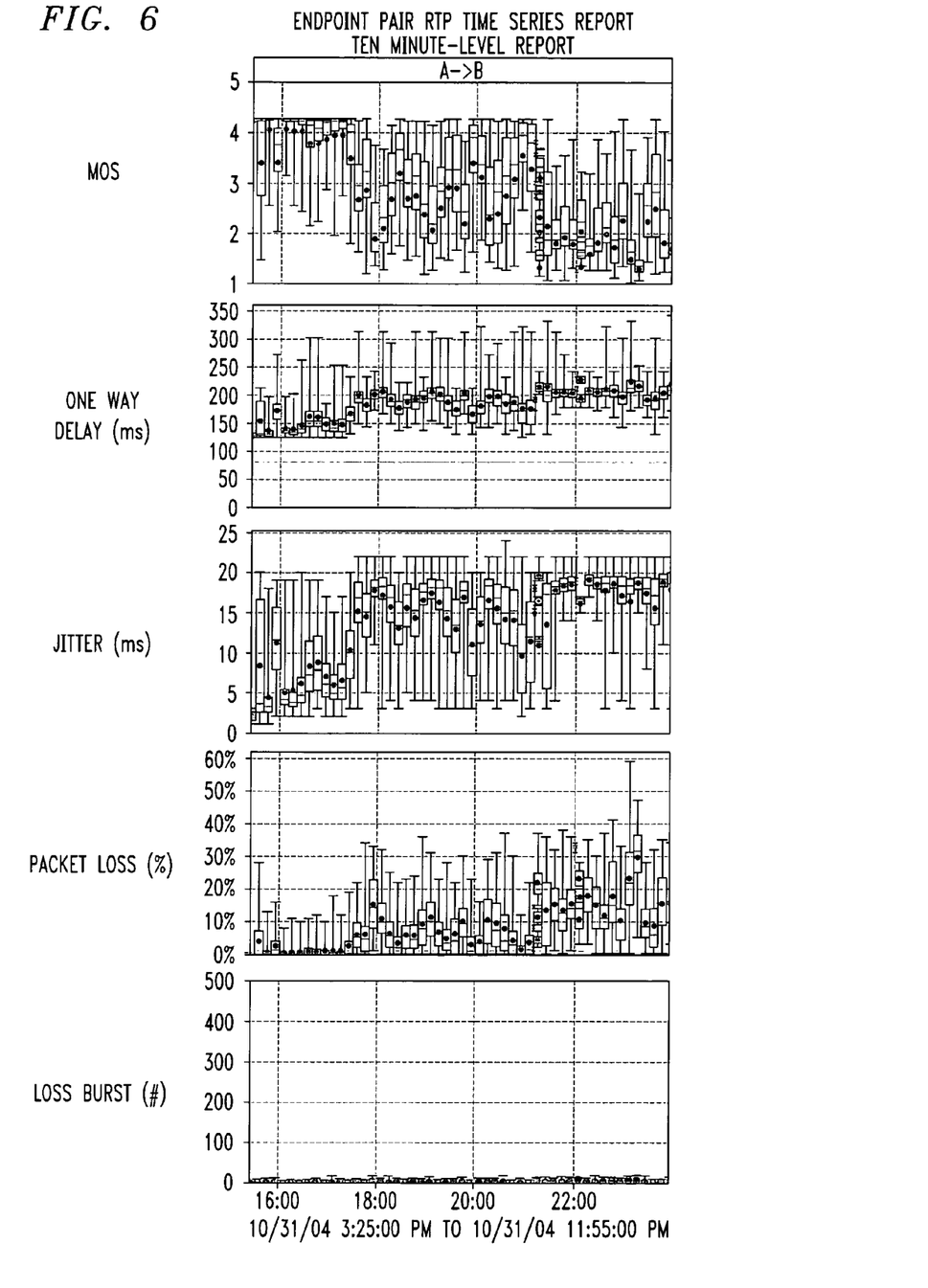
Figure 7:
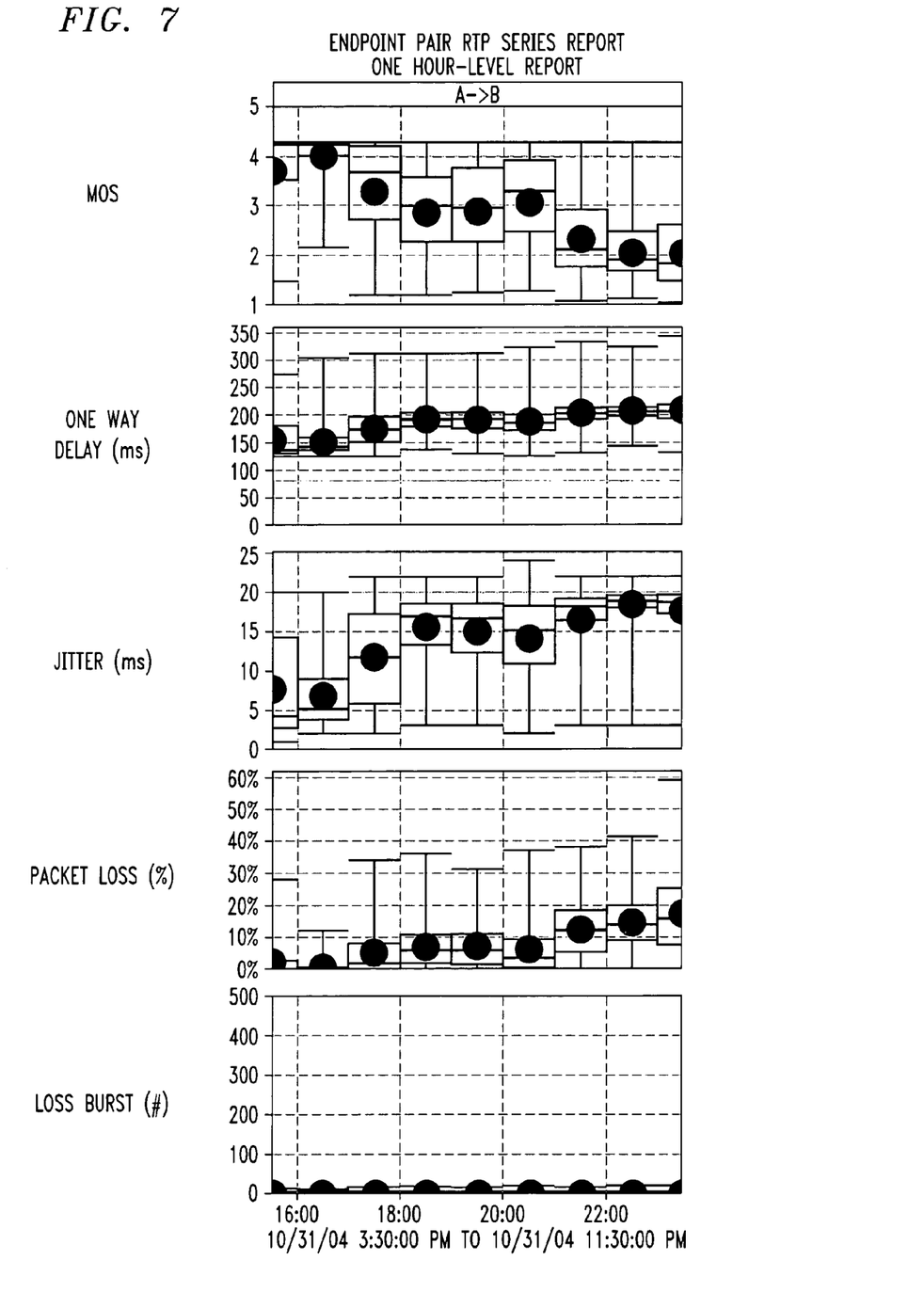
Figure 8:
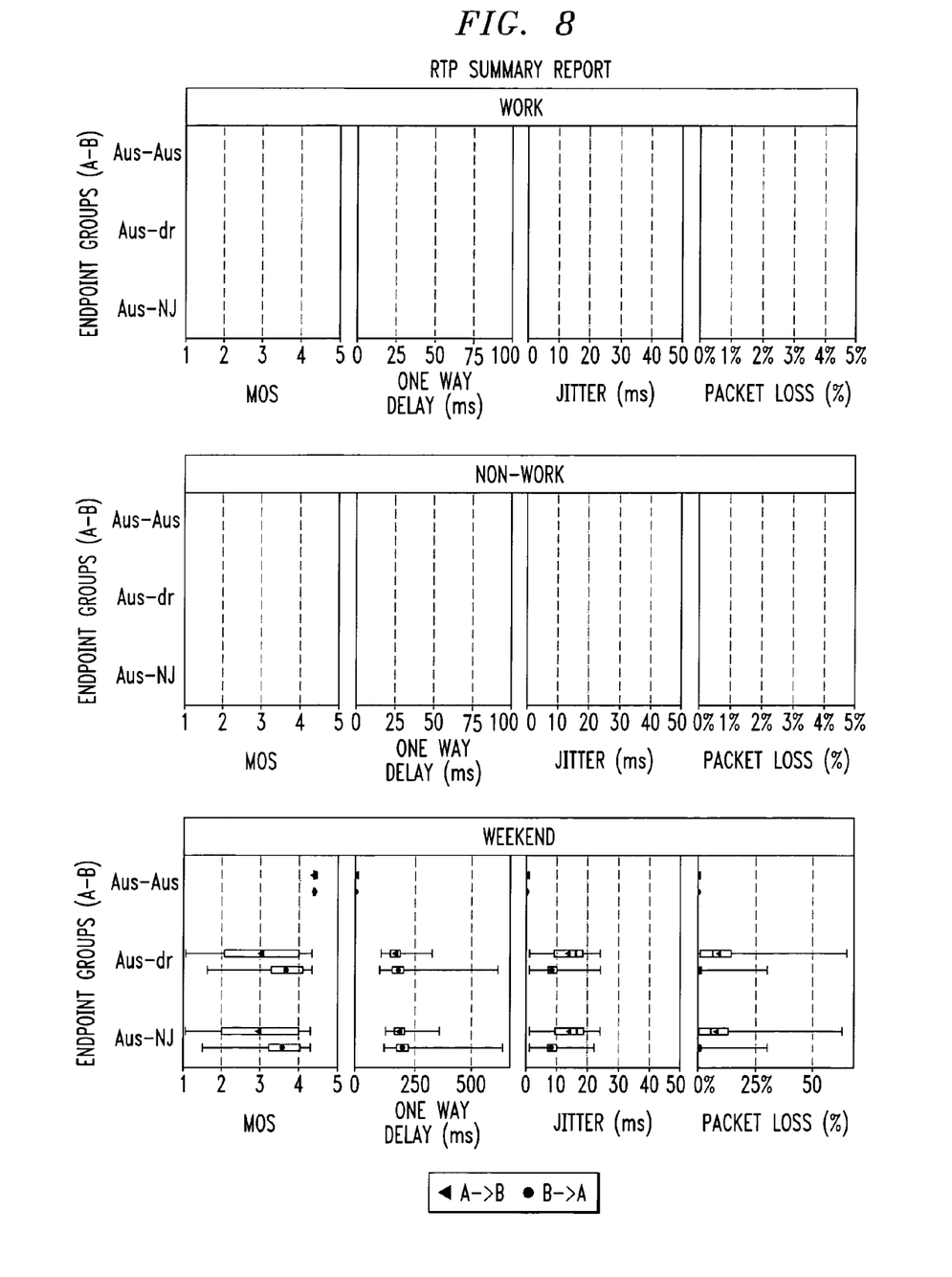

Once the data is gathered in frequency tables 300, it can be used by report generation 112 (see FIG. 1) to generate various reports. Examples of such reports are shown in FIGS. 5-8. FIGS. 5-7 are time-series reports that show the same data between the same two entities (endpoints in this example), but each using a different time interval to generate an aggregated frequency table. Each box-and-whisker represents a corresponding frequency table. In FIG. 5, each box-and-whisker is obtained from an aggregated frequency table that is aggregated over one minute. In FIG. 6, each box-and-whisker is obtained from an aggregated frequency table that is aggregated over 10 minutes. In FIG. 7, each box-and-whisker is obtained from an aggregated frequency table that is aggregated over one hour. In each case, one can click on a displayed individual box-and-whisker to see a corresponding histogram. This shows how the frequency-table approach is easily used to view the same data at different levels of aggregation. FIG. 8, shows a summary report, which creates one frequency table for each metric by aggregating individual frequency tables over a selected time period. In the lower one-third of FIG. 8, one box-and-whisker corresponds to one aggregated frequency table over a time period of "weekend."

Of course, various changes and modifications to the illustrative embodiment described above will be apparent to those skilled in the art. For example, the invention may be used with protocols other than RTP, and to store performance data other than the five metrics described above. These include other measurements related to real-time traffic, such as "R factor" (described in ITU TG.107), or PSQM (described in ITU TP.861). These changes and modifications can be made without departing from the spirit and the scope of the invention and without diminishing its attendant advantages. It is therefore intended that such changes and modifications be covered by the following claims except insofar as limited by the prior art.

What is claimed is:

1. A method of monitoring network performance, comprising:
    gathering over time in a network monitor data on performance of a communications network;
    storing in a data-storage facility frequency tables each corresponding to a different one of a plurality of data ranges and indicating a count of how much of the data gathered within a time interval falls within the corresponding one of the plurality of data ranges, wherein at least two of the plurality of data ranges are of different sizes; and
    omitting in the data storage facility those frequency table data ranges that correspond to individual ones of the data ranges that have a count of zero.

2. The method of claim 1 further comprising:
    generating in a report-generation facility a report from the stored data showing in box-and-whisker form a distribution of the data over time for each metric.

3. The method of claim 1 further comprising:
    consolidating in a data-consolidation facility the data from a plurality of stored said frequency tables for a plurality of different time intervals into a single stored frequency table for a time interval comprising the plurality of different time intervals; and
    deleting in the data-consolidation facility from storage the plurality of the frequency tables for the plurality of different time intervals.

4. The method of claim 1 wherein:
    gathering comprises
    gathering in the network monitor over the time data on a plurality of metrics representing the performance of the communications network; and
    storing comprises
    storing in the data-storage facility the data on each said metric over each time interval in a different set of said frequency tables.

5. The method of claim 4 wherein:
    the metrics comprise delay, jitter, and loss.

6. The method of claim 5 wherein:
    the metrics further comprise at least one of loss burstiness and mean opinion score.

7. The method of claim 6 wherein:
    the network is a real-time communications network.

8. The method of claim 6 wherein:
    the network is a voice over the Internet Protocol (VoIP) network.

9. The method of claim 8 wherein:
    the VoIP network transports communications traffic via a real-time protocol (RTP).

10. An apparatus for performing the method of one of claims 1-9.

11. An apparatus for monitoring network performance, comprising:
- means for gathering over time data on performance of a communications network;
- data-storage means; and
- means for storing in the data-storage means frequency tables each corresponding to a different one of a plurality of data ranges and indicating a count of how much of the data gathered within a time interval falls within the corresponding one of the plurality of data ranges, wherein at least two of the plurality of data ranges are of different sizes, and omitting those frequency table data ranges that correspond to individual ones of the data ranges that have a count of zero.

12. An apparatus comprising:
- a network monitor that gathers over time data on performance of a communications network; and
- a data-storage facility that stores the data gathered by the network monitor in frequency tables each corresponding to a different one of a plurality of data ranges and indicating a count of how much of the data gathered within a time interval falls within the corresponding one of the plurality of data ranges wherein at least two of the plurality of data ranges are of different sizes, and omit those frequency table data ranges that correspond to individual ones of the data ranges that have a count of zero.

13. The apparatus of claim 12 wherein:
- the network monitor comprises a network services server; and
- the data-storage facility comprises a database.

14. The apparatus of claim 12 further comprising:
- a report-generation facility that generates reports from the data stored by the data-storage facility showing in box-and-whisker form a distribution of the data over time for each metric.

15. The apparatus of claim 13 further comprising:
- a data-consolidation facility that consolidates the data from a plurality of stored said frequency tables for a plurality of different time intervals into a single stored frequency table for a time interval comprising the plurality of different time intervals, and deletes from the data-storage facility the frequency tables for the plurality of different time intervals.

16. The apparatus of claim 12 wherein:
- the network monitor gathers over the time data on a plurality of metrics representing the performance of the communications network; and
- the data-storage facility stores the data on each said metric over each time interval in a different set of said frequency tables.

17. The apparatus of claim 16 wherein:
- the metrics comprise delay, jitter, and loss.

18. The apparatus of claim 17 wherein:
- the metrics further comprise at least one of loss burstiness and mean opinion score.

19. The apparatus of claim 18 wherein:
- the network monitor is adapted to gather data on performance of a real-time communications network.

20. The apparatus of claim 19 wherein:
- the network is a voice over the Internet Protocol (VoIP) network.

21. The apparatus of claim 20 wherein:
- the VoIP network transports communications traffic via a real-time protocol (RTP).

* * * * *